(12) United States Patent
Müller

(10) Patent No.: US 7,997,533 B2
(45) Date of Patent: Aug. 16, 2011

(54) FIRE BARRIER FOR AN AIRCRAFT FUSELAGE

(75) Inventor: Rainer Müller, Rosengarten (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 12/260,902

(22) Filed: Oct. 29, 2008

(65) Prior Publication Data
US 2009/0050741 A1 Feb. 26, 2009

Related U.S. Application Data

(63) Continuation of application No. PCT/EP2007/003692, filed on Apr. 26, 2007.

(60) Provisional application No. 60/746,180, filed on May 2, 2006.

(51) Int. Cl.
*B64D 45/00* (2006.01)

(52) U.S. Cl. .................................................. 244/129.2

(58) Field of Classification Search ............... 244/129.5, 244/118.1, 118.5, 129.2; 52/98–100; 137/67, 137/68.13
See application file for complete search history.

(56) References Cited

U.S. PATENT DOCUMENTS

| | | | | |
|---|---|---|---|---|
| 4,390,152 A | * | 6/1983 | Jorgensen | 244/118.5 |
| 4,646,993 A | * | 3/1987 | Baetke | 244/117 R |
| 4,821,909 A | * | 4/1989 | Hibler et al. | 220/203.08 |
| 4,899,960 A | * | 2/1990 | Hararat-Tehrani et al. | 244/118.5 |
| 5,871,178 A | * | 2/1999 | Barnett et al. | 244/118.5 |
| 6,264,141 B1 | * | 7/2001 | Shim et al. | 244/118.5 |
| 6,382,563 B1 | | 5/2002 | Chiu | |
| 6,435,455 B1 | | 8/2002 | Holman et al. | |
| 6,491,254 B1 | | 12/2002 | Walkinshaw et al. | |
| 6,607,003 B1 | * | 8/2003 | Wilson | 137/68.23 |
| 7,007,892 B2 | * | 3/2006 | Tubbs | 244/118.5 |
| 2005/0224647 A1 | | 10/2005 | Tubbs | |

FOREIGN PATENT DOCUMENTS

| | | |
|---|---|---|
| DE | 2614814 A1 | 10/1976 |
| DE | 60114334 T2 | 6/2006 |
| EP | 0404419 A1 | 12/1990 |
| EP | 1186531 A2 | 3/2002 |
| RU | 2 260 548 C2 | 11/2000 |
| WO | 93/19984 | 10/1993 |
| WO | 00/37313 A1 | 6/2000 |

OTHER PUBLICATIONS

Russian Decision to Grant for Russian Application No. 2008143561/12(056733) mailed Sep. 29, 2010.

* cited by examiner

*Primary Examiner* — Tien Dinh
(74) *Attorney, Agent, or Firm* — Ingrassia Fisher & Lorenz, P.C.

(57) ABSTRACT

When a fire breaks out, air flows that promote the spread of fire may occur in the region between the load bay and the skin of the aircraft. According to one embodiment of the present invention, a fire barrier is disclosed that allows rapid decompression of the passenger cabin in the normal operating mode of the aircraft and prevents flashovers in case of a fire. In this case, the fire barrier may be arranged at different positions in the intermediate wall space of the aircraft.

10 Claims, 4 Drawing Sheets

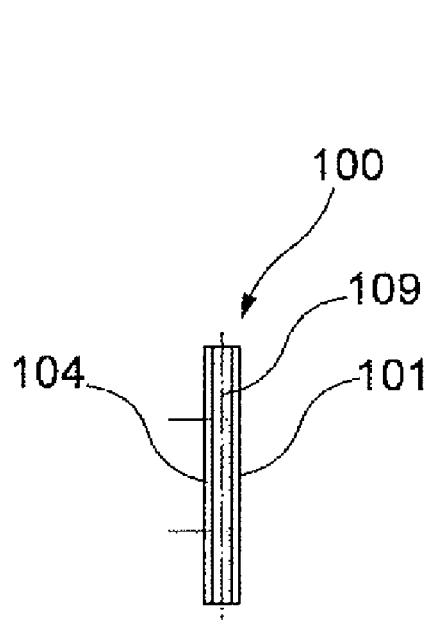
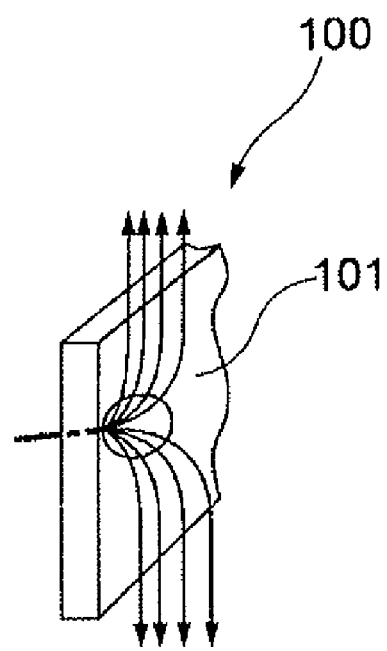
Fig. 4            Fig. 5
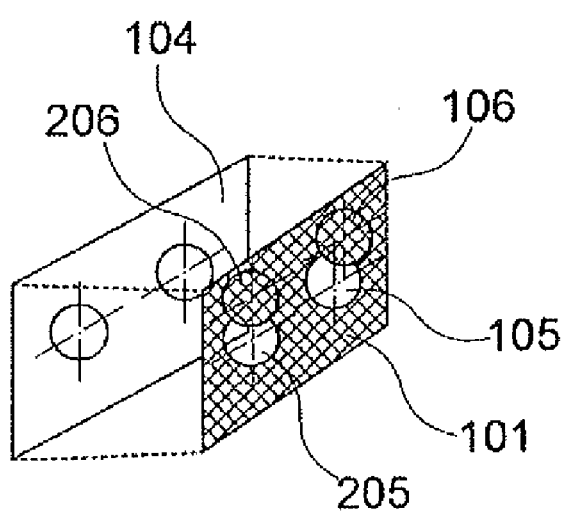
Fig. 6

FIRE BARRIER FOR AN AIRCRAFT FUSELAGE

CROSS-REFERENCE TO RELATED APPLICATION

This application is a continuation of International Application No. PCT/EP2007/003692, filed Apr. 26, 2007, which was published under PCT Article 21(2) and which claims priority to German Patent Application No. 102006020147.7 filed May 2, 2006 and of U.S. Provisional Patent Application No. 60/746,180 filed May 2, 2006, the disclosures of which are hereby incorporated herein by reference.

TECHNICAL FIELD

The present invention pertains to fire protection in aircraft. The present invention specifically pertains to a fire barrier for an aircraft in order to prevent burn-through between the cargo compartment and the passenger cabin, and to an aircraft that comprises a corresponding fire barrier.

BACKGROUND

In conventional aircraft fuselages used in the construction of passenger aircraft, an intermediate space is formed in the fuselage region between the cargo compartment and the actual aircraft fuselage. The beginning of this intermediate space begins at the outer edge of the cargo compartment floor. The cargo compartment floor is connected to the skin of the aircraft fuselage in the edge regions by means of thrust plates or other structural arrangements. The passenger floor forms the upper end of the intermediate space. The passenger floor is open in the region between the cabin paneling and the skin of the aircraft in order to realize pressure compensation in case of rapid decompression. This applies analogously to the thrust plates at the end of the cargo compartment floor that feature corresponding openings in order to realize compensation flow if rapid decompression occurs. In case of a fire, a chimney effect may develop in this intermediate space and accelerate the spread of fire.

In view of the foregoing, at least one objective of the present invention is to make available fire protection in aircraft fuselages that decelerates a spread of fire. In addition, other objectives, desirable features, and characteristics will become apparent from the subsequent summary and detailed description, and the appended claims, taken in conjunction with the accompanying drawings and this background.

SUMMARY

According to one embodiment of the present invention, a fire barrier for an aircraft is disclosed in order to prevent burn-through between the cargo compartment and the passenger cabin. The fire barrier comprises a panel that is resistant to burning through and serves for blocking a fire in the intermediate wall space of the aircraft fuselage, and an air passage for realizing a defined air flow through the fire barrier in the normal operating mode of the aircraft such that rapid decompression can be achieved.

If an inventive fire barrier is provided, it is not only possible to block the spread of fire in the intermediate wall space, but also to ensure that rapid pressure compensations can be realized in the normal operating mode of the aircraft.

In case of a fire, these measures make it possible to significantly decelerate the spread of fire or to stop the fire entirely.

According to another embodiment of the present invention, the fire barrier furthermore comprises a floor element that is connected to the panel resistant to burning through. The air passage is realized in the form of an air gap between the floor element and the panel such that the air required for rapid decompression or climate control flows through the fire barrier.

The floor element may be realized, for example, in the form of a thrust plate that is arranged at the end of a cargo compartment floor. This makes it possible to incorporate the fire barrier into the structural components of an aircraft fuselage. The floor element fulfills a double function in this case, namely the function of an element of the fire barrier and the function of a structural element of the aircraft fuselage.

According to another embodiment of the present invention, the panel that is resistant to burning through features an air passage in the form of an opening with a seal, and the seal is designed for sealing the opening in case of a fire.

For example, the seal may be open in the normal operating mode such that rapid pressure compensation can be realized. If heat is generated, the seal autonomous seals the opening such that the fire is blocked and air flows are prevented.

According to another embodiment of the present invention, the opening is sealed under the influence of a spring force. For example, a spring mechanism may be provided that is pre-stressed when the opening is in the open position. If a fire is detected or corresponding heat is generated, the spring is released and causes the seal to seal the opening. The spring may be retained, for example, by means of a heat-sensitive material that is destroyed when corresponding heat is generated. However, it would also be possible to provide electronic sealing mechanism or other more complicated sealing mechanisms that feature corresponding sensors.

According to another embodiment of the present invention, the opening is sealed under the influence of gravity. This embodiment represents a very simple sealing mechanism. The flap is held in the open position, for example, by means of a heat-sensitive material and drops so as to seal the air passage under the influence of gravity once the heat-sensitive material is damaged or destroyed accordingly by the generated heat.

According to another embodiment of the present invention, the fire barrier furthermore comprises a spacer. The panel resistant to burning through is realized in the form of a flap that is fixed in an open state by means of the spacer such that the air passage is open, and wherein the spacer is designed for sealing the air passage through the panel in case of a fire.

The opening may also be sealed, for example, under the influence of gravity or a spring force or the like in this case. One decisive aspect of this embodiment is that the panel is retained by the spacer. If heat is generated or a source of fire or heat impact is detected, the spacer is destroyed or, for example, bent or otherwise deformed such that the flap closes. For example, the spacer consists of a bimetal or a material with memory effect, a memory metal alloy or a thermoplastic polymer. This means that the flap closes due to the heating of a metal or another corresponding material, for example, a material that contracts or is destroyed when heated.

According to another embodiment of the present invention, the fire barrier furthermore comprises an intumescent material for sealing the air passage in case of a fire. In this case, a material is used, for example, that expands in a foam-like fashion under the influence of heat. The intumescent material may be realized in the form of a coating of the panel. In this case, the air passage is realized in the form of air holes in the panel that are clogged when the intumescent material expands. Consequently, electronic detectors or other types of detectors are not required.

According to another embodiment of the present invention, the panel resistant to burning through comprises a material such as, for example, aramide fiber, carbon fiber, glass fiber, titanium or ceramic. A high fire stability and a high heat resistance can be ensured in this fashion.

The invention furthermore discloses an aircraft that features an above-described fire barrier.

BRIEF DESCRIPTION OF THE DRAWINGS

The present invention will hereinafter be described in conjunction with the following drawing figures. The figures show schematic representations that are not drawn true-to-scale and like numerals denote like elements.

FIG. 4 shows a top view of the fire barrier according to FIG. 3 in the direction of the X-axis;

FIG. 5 shows a schematic transparent representation of the fire barrier according to FIG. 3;

FIG. 6 shows a fire barrier according to another embodiment of the present invention;

DETAILED DESCRIPTION

The following detailed description is merely exemplary in nature and is not intended to limit application and uses. Furthermore, there is no intention to be bound by any theory presented in the preceding summary and background or the following detailed description.

Figure 1:
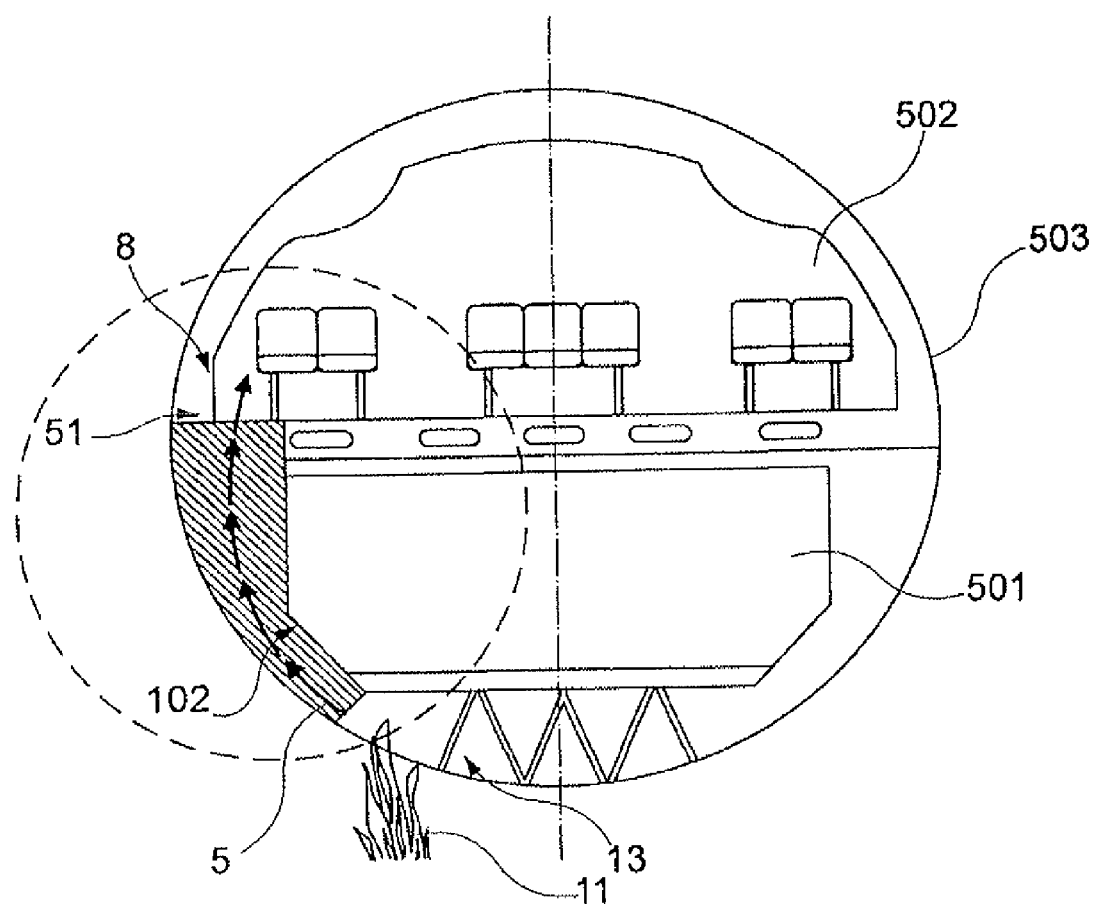
FIG. 1 shows a schematic representation of an aircraft fuselage in the form of a cross section.

FIG. 1 shows a schematic cross-sectional representation of an aircraft fuselage. The aircraft fuselage features a load bay 501, a passenger compartment 502, a skin 503, a passenger floor 51 and an intermediate space 102 formed between the load bay 501 and the skin 503.

The beginning of the intermediate space 102 begins at the outer edge of the cargo compartment floor 5. The cargo compartment floor is connected to the skin of the aircraft fuselage in the edge regions by means of corresponding thrust plates (not shown in FIG. 1) or other structural arrangements. The passenger floor 51 forms the upper end of the intermediate space. The passenger floor 51 is open in the region between the cabin paneling 8 and the skin 503 of the aircraft. The thrust plates 5 at the end of the cargo compartment floor also feature corresponding openings (see reference symbol 10, FIG. 2). This makes it possible to realize a compensation flow in case of rapid decompression.

Figure 2:
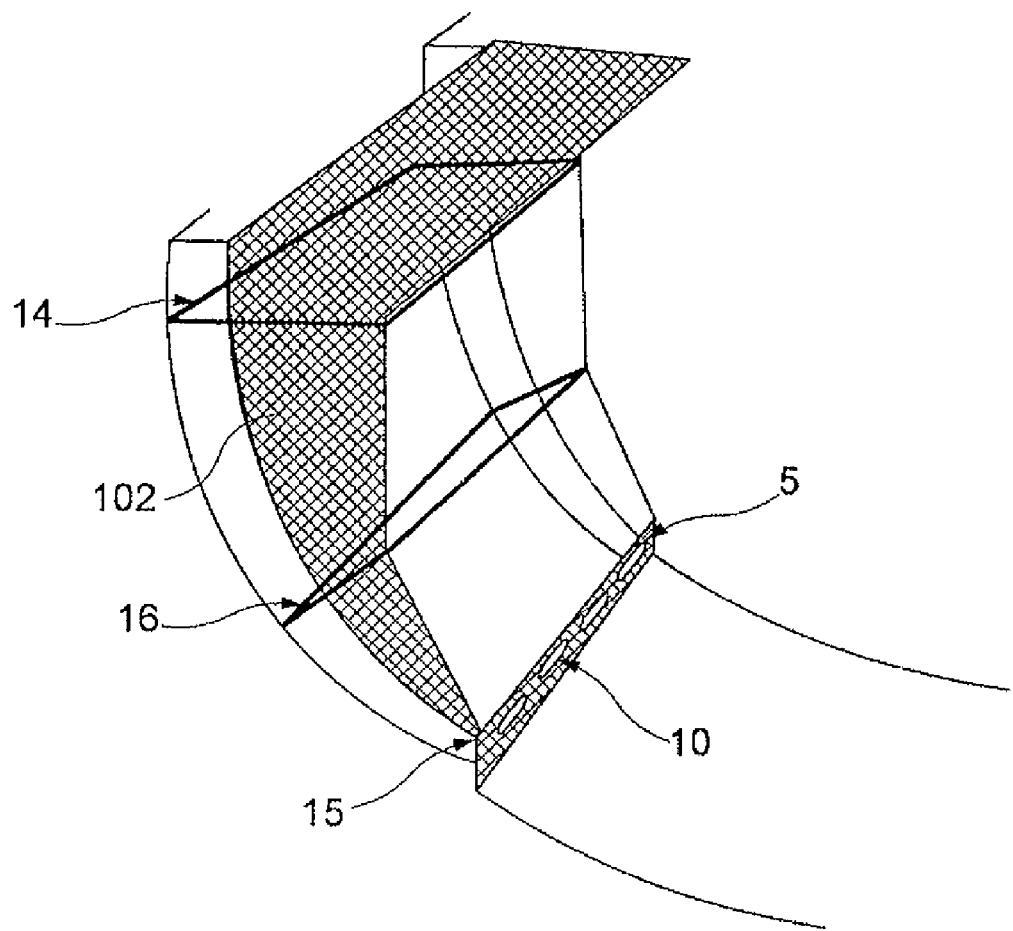
FIG. 2 shows a schematic representation of the intermediate space between the load bay and the outer wall of the fuselage.

FIG. 2 shows a schematic representation of the intermediate space 102 of FIG. 1. The fire barrier may be arranged at different positions in the aircraft fuselage and, in particular, in the intermediate space 102. For example, it is arranged at the position 15, where the thrust plate 5 is also situated. In this case, the thrust plate 5 forms part of the fire barrier.

The fire barrier may also be arranged, for example, at the position 16 that lies somewhere between the beginning and the end of the intermediate space 102. The fire barrier may also be arranged at the position 14 that is situated in the region of the passenger floor 51 (see FIG. 1).

If no fire barrier is provided, a so-called chimney effect may develop between the cargo compartment 501 and the aircraft fuselage 503 (see FIG. 1), i.e., in the intermediate space 102, in case of a fire. The reason for this chimney effect may, for example, be a fire that broke out after a crash of the aircraft or an emergency landing or another hazardous situation. For example, the aircraft may catch fire after an emergency landing on the ground and subsequently burn through from the outside toward the inside (see reference symbol 11 in FIG. 1) in the bottom region or at another location due to escaping kerosene that catches on fire.

Such a fire initially affects the bilge region situated underneath the cargo compartment because the escaping kerosene has affected a so-called "pool-fire" on the bottom of the aircraft. The fire burns through the aircraft fuselage within a short period of time and then enters into the region underneath the cargo compartment floor, namely the so-called bilge of the aircraft (see reference symbol 13 in FIG. 1).

The described intermediate space 102 enables the fire to continue burning in the direction of the passenger cabin 502. In this case, the spread of fire is accelerated in the intermediate space 102 due to the so-called chimney effect. This effect is known from the construction of chimneys, in which the difference in elevation between the inlet opening and the outlet opening results in a pressure difference in an enclosed channel that causes a corresponding acceleration of the air in the channel (or in the intermediate region, respectively). However, this desirable effect in the construction of chimneys causes the spread of fire to accelerate in the direction of the passenger cabin 502 in the described "post-crash-fire" scenario.

Figure 3:
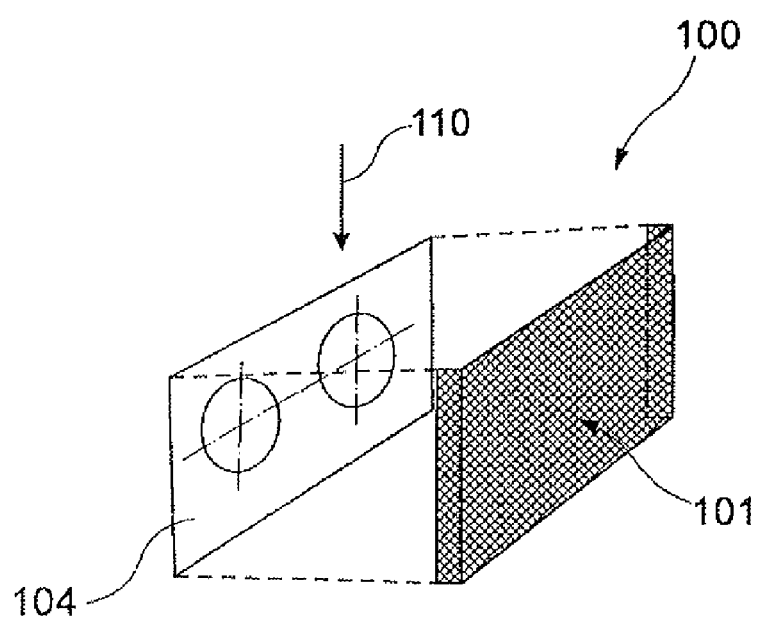
FIG. 3 shows a schematic exploded view of a fire barrier according to one embodiment of the present invention.

FIG. 3 shows a schematic exploded view of a fire barrier according to one embodiment of the present invention. The fire barrier 100 comprises a panel 101 that is resistant to burning through and a floor element 104. The panel 101 can have or consist of, for example, a structure that is built up from aramide and/or carbon fibers. However, it would also be conceivable to use structures that are built up from glass fibers. The panel 101 may also have or consist of titanium sheets or ceramic plates.

The panel 101 is installed in a defined distance from the floor plate 104 (that consists, for example, of the thrust plate 5) such that it results in an air gap 109. Air quantities required for rapid decompression and climate control can flow toward the under floor region via this air gap 109. The panel 101 is closed and consists of a material that is resistant to burning through.

FIG. 4 shows a schematic top view of the fire barrier 100 according to FIG. 3 in the X-direction 110. According to FIG. 4, the floor element 104 (thrust plate 5) and the end face of the panel 101 are spaced apart from one another such that the air gap 109 is formed.

FIG. 5 shows a schematic representation of the fire barrier 100 according to FIG. 3, in which the panel is illustrated in a transparent fashion so as to provide a better overview. The arrows in FIG. 5 identify the air flow through an opening in the floor element 104.

According to FIG. 5, the air flow is diverted by the panel 101 such that a spread of fire is largely prevented. The described chimney effect is prevented in the intermediate space in this fashion. As mentioned above, the fire barrier 100 may be arranged at different positions in the intermediate wall space: in the region of the passenger floor (FIG. 2, reference symbol 14); at the end of the cargo compartment floor (FIG. 2, reference symbol 15); or at positions situated between these two installation locations (FIG. 2, reference symbol 16).

One basic prerequisite for the inventive function of the fire barrier is such a construction that a defined flow through the fire barrier can be guaranteed in the normal operating mode of the aircraft in order to ensure rapid decompression. However, the spread of fire and the associated chimney effect should be prevented in case of a fire.

Reduced flashovers are achieved with the panel 101 resistant to burning through such that there is no risk of the fire burning through in the direction of the passenger cabin.

FIG. 6 shows a schematic representation of a fire barrier according to another embodiment of the present invention. The fire barrier comprises a panel 101 that is resistant to burning through and features openings 105, 205. An arbitrary number of openings may be provided in this case.

The openings 105, 205 are provided with corresponding flap arrangements 106, 206 that are open or pivoted upwardly in the normal operating mode of the aircraft. The panel 101 resistant to burning through is installed in front of the thrust plate 104. Possible materials for the panel were already mentioned above.

The openings 105, 205 provide a sufficient clear cross section for ensuring rapid decompression. The flaps 106, 206 are bonded to the panel 101, for example, with the aid of a thermoplastic polymer and rotatably fixed on the panel 101. If heat is generated, the thermoplastic mounting of the flaps 106, 206 melts such that the flaps pivot about their corresponding axes of rotation and seal the openings 105, 205.

The pivoting motion of the flaps about their axes of rotation may be realized, for example, under the influence of gravity only. However, it would also be possible to provide corresponding spring mechanisms or other rotary mechanisms. Naturally, the flaps may also be constructed in a sliding fashion such that they do not have to be turned in order to seal the openings, but rather displaced or simply dropped.

Figure 7:
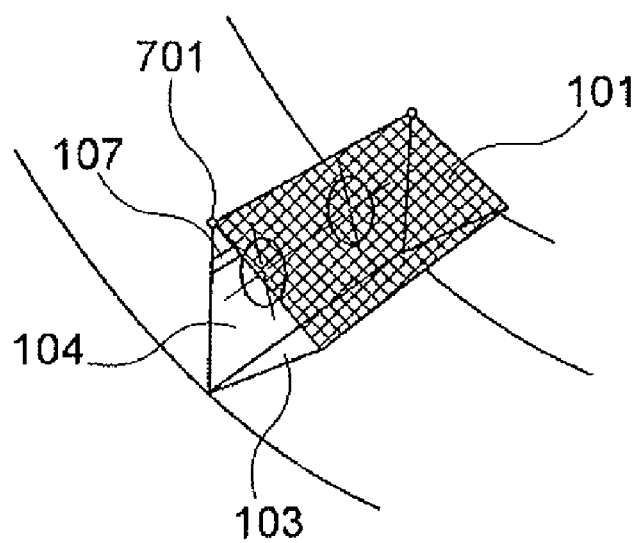
FIG. 7 shows a fire barrier according to another embodiment of the present invention.

FIG. 7 shows another embodiment of a fire barrier according to the present invention. In this case, the panel 101 resistant to burning through is realized in the form of a flap that pivots about an axis 701. In case of a fire, the flap 101 is closed, for example, due to the melting of a spacer 107 that consists, for example, of a thermoplastic polymer. Alternatively, the air passage could also be sealed by utilizing a bimetal strip or a "memory metal" alloy. In this case, the flap 101 closes due to the heating of the metal or another material that contracts when heated.

Figure 8:
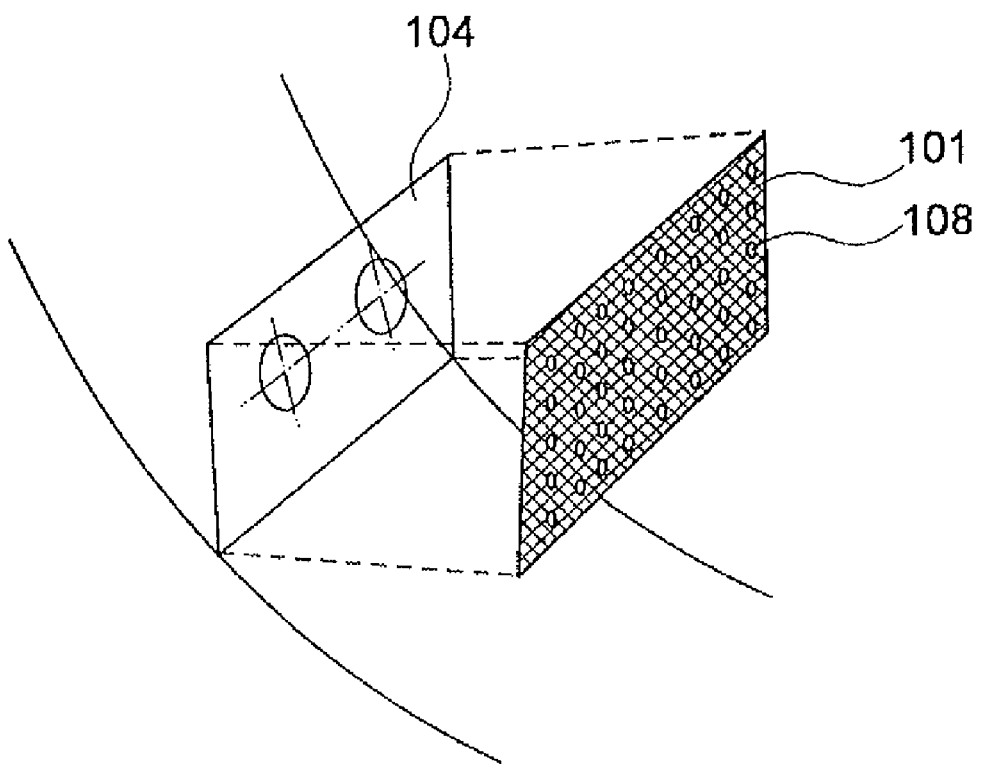
FIG. 8 shows a fire barrier according to another embodiment of the present invention.

FIG. 8 shows another embodiment of the present invention. The panel 101 resistant to burning through features a multitude of air passages in the form of holes 108. For example, the panel 11 in the form of a perforated plate is arranged directly on the thrust plate 104. The holes 108 ensure a sufficient clear cross section for realizing rapid decompression.

The rear side of the panel 101 is provided with an intumescent coating (not illustrated in FIG. 8) that swells or foams when heat is generated and seals the holes 108 during this process in such a way that no flashover or chimney effect can occur. This provides firefighters with additional time for fighting the fire and for rescuing the passengers. The safety of the passengers with respect to fires in the passenger cabin is additionally improved. The overall safety standard of the aircraft is therefore raised.

In addition, it should be noted that "comprising" does not exclude any other elements or steps and that "a" or "an" does not exclude a multitude. It should furthermore be noted that characteristics or steps that were described with reference to one of the above-discussed embodiments can also be used in combination with other characteristics or steps of other above-discussed embodiments. Furthermore, while at least one exemplary embodiment has been presented in the foregoing summary and detailed description, it should be appreciated that a vast number of variations exist. It should also be appreciated that the exemplary embodiment or exemplary embodiments are only examples, and are not intended to limit scope, applicability, or configuration of the in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. An aircraft, comprising:
   a load bay;
   a skin;
   a passenger floor formed between the load bay and the skin;
   an intermediate wall space formed between the load bay and the skin; and
   a fire barrier in the intermediate wall space, the fire barrier comprising:
      a floor element; and
      a burn resistant panel installed at a predefined distance from the floor element resulting in an air gap between the floor element and the burn resistant panel adapted to realize a defined air flow through the fire barrier for climate control and rapid decompression;
   the burn resistant panel adapted to block a fire through the air gap and the intermediate wall space of the aircraft fuselage,
   wherein the floor element is coupled to the burn resistant panel; and
   wherein the floor element is realized in the form of a thrust plate arranged at an end of a cargo compartment floor.

2. The aircraft of claim 1, wherein the air gap includes a seal that seals the gap in case of the fire.

3. The aircraft of claim 2, wherein the seal is arranged and fixed on the burn resistant panel with a thermoplastic polymer; and wherein the thermoplastic polymer melts under the influence of heat to release the seal to seal the gap.

4. The aircraft of claim 2, wherein the gap is sealed under the influence of a spring force.

5. The aircraft of claim 2, wherein the gap is sealed under the influence of gravity.

6. The aircraft of claim 1, furthermore comprising a spacer, wherein the burn resistant panel is realized in the form of a flap that is fixed in an open state by the spacer such that the air gap is open; and wherein the spacer seals the air gap through the burn resistant panel in case of a fire.

7. The aircraft of claim 6, wherein the spacer comprises a material that is selected from the group consisting at least one of a bimetal, a material having a memory-effect, and a thermoplastic polymer.

8. The aircraft of claim 1, furthermore comprising an intumescent material for sealing the air gap in case of fire.

9. The aircraft of claim 8, wherein the intumescent material is realized in a form of a coating on the burn resistant panel; and wherein the burn resistant panel comprises air holes that form the air gap.

10. The aircraft of claim 1, wherein the burn resistant panel comprises a material that is selected from the group consisting of at least one of aramide fibers, carbon fibers, glass fibers, titanium, or ceramic.

* * * * *

UNITED STATES PATENT AND TRADEMARK OFFICE
CERTIFICATE OF CORRECTION

PATENT NO. : 7,997,533 B2  
APPLICATION NO. : 12/260902  
DATED : August 16, 2011  
INVENTOR(S) : Rainer Müller Page 1 of 1

It is certified that error appears in the above-identified patent and that said Letters Patent is hereby corrected as shown below:

Col. 6, line 65, add the following claims:

14. (New) An aircraft, comprising:
a load bay;
a skin;
a passenger floor formed between the load bay and the skin;
an intermediate wall space formed between the load bay and the skin;
a fire barrier in the intermediate wall space, the fire barrier comprising:
a floor element; and
a burn resistant panel installed at a predefined distance from the floor element resulting in an air gap between the floor element and the burn resistant panel adapted to realize a defined air flow through the fire barrier for climate control and rapid decompression, the burn resistant panel adapted to block a fire through the air gap and the intermediate wall space of the aircraft fuselage; and
a seal arranged and fixed on the burn resistant panel with a thermoplastic polymer that melts under the influence of heat to release the seal to seal the gap; wherein the floor element is coupled to the burn resistant panel; and wherein the floor element is realized in the form of a thrust plate arranged at an end of a cargo compartment floor.

15. (New) The aircraft of claim 14, further comprising a spacer, wherein the burn resistant panel is realized in the form of a flap that is fixed in an open state by the spacer such that the air gap is open; and wherein the spacer seals the air gap through the burn resistant panel in case of a fire.

Signed and Sealed this  
Eighteenth Day of September, 2012

David J. Kappos  
*Director of the United States Patent and Trademark Office*